Patented Nov. 11, 1930

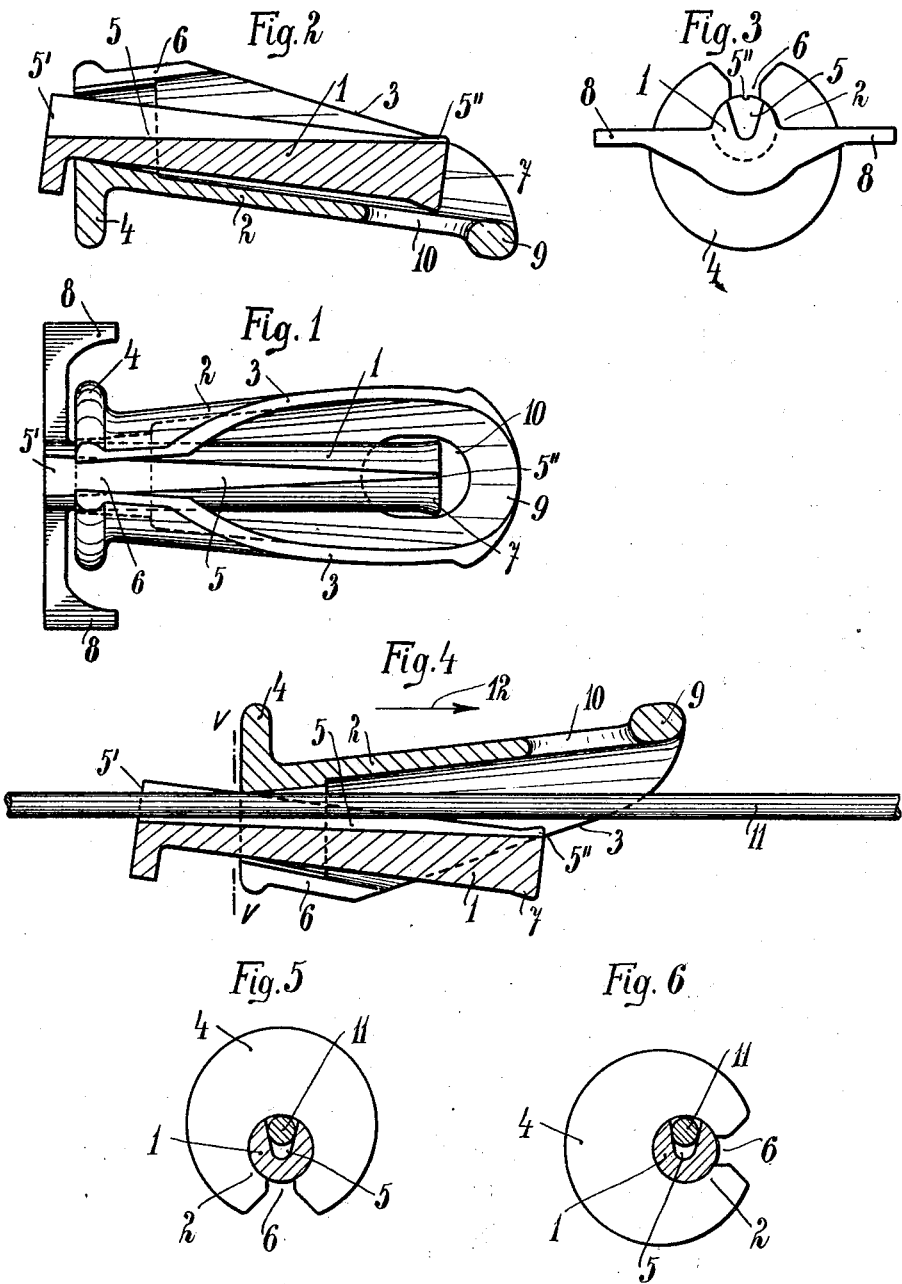

1,781,080

UNITED STATES PATENT OFFICE

JOSEF RING, OF POLERADY, CZECHOSLOVAKIA

CABLE GRIP

Application filed March 27, 1930, Serial No. 439,422, and in Czechoslovakia February 26, 1930.

This invention relates to a device for gripping cables, wires and the like and consists in the provision of two telescopically adjustable gripping members one of which is formed with a tapered V-groove in which the wire or cable can be clamped by a longitudinal relative displacement of the two members, the outer member having a slit through which the cable is admitted into the groove. Preferably the groove is made in the inner or core member, the outer member having the form of a conical sleeve one end of which has an internal diameter which is substantially equal to the external diameter of the cylindrical core member.

Fig. 1 of the accompanying drawings represents a view of a wire grip according to the invention in position to receive the wire, Fig. 2 is a longitudinal section of the device, Fig. 3 is an end view, Fig. 4 is a longitudinal section of the device shown in operative position on the wire, Fig. 5 is a section on the line V—V of Fig. 4, and Fig. 6 is another cross-section of the same showing the gripping members in a different relative position.

The device comprises two gripping members 1 and 2 one of which is arranged to slide on and rotate about the other. The inner or core member 1 is preferably cylindrical and is formed with a longitudinal, tapered V-groove 5 wherein the cable or wire can be clamped by the outer member on the latter being longitudinally displaced on the core member. The cross-sectional difference between the two ends 5' and 5'' of the groove is the same as the difference between the largest and smallest size of wire or cable for which the device is to be used. The outer member 2 is preferably made in the form of a conical sleeve and it is provided with a slit 6 through which the wire is admitted into the groove 5. For the reception of the wire the sleeve is turned so that the slit 6 registers with the groove 5, as shown in Figs. 1 and 2. After the wire has been admitted into the groove, the sleeve is turned into one of the positions shown in Figs. 5 and 6, and it is then slid in the direction of the arrow 12 (Fig. 4) along the core member until its narrow end, whose internal diameter is substantially equal to the external diameter of the core member, engages the wire 11 and clamps it in the groove 5. Thereupon further slipping of the two members relative to the wire will be prevented, and a good hold on the wire will be obtained.

A flange 4 at one end of the sleeve and a bead 9 at the other end form abutments between which the hand will obtain a firm grip on the sleeve.

The sleeve is preferably truncated obliquely as shown at 3 at the side formed with the slit 6. An aperture 10 is made in the sleeve near the bead 9 so as to enable the sleeve to be attached to a pulley block or other suitable wire stretching device.

The core member 1 is formed with end enlargements 7 and 8 which prevent it from leaving the sleeve. The enlargement 8 is extended into wings whereby the core member can easily be retained for rotary displacement relative to the sleeve 2.

The groove 5 may be made in the sleeve 2 instead of in the core member.

I claim:—

1. A wire or cable grip comprising two telescopically adjustable members, one of said members having a tapered V-groove arranged so as to be swept by the other member, the other member having a slit adapted to admit the cable into the groove, the members being adapted, on a longitudinal relative displacement, to clamp the cable in the groove.

2. A cable grip comprising a core member having a longitudinal tapered V-groove, and a sleeve member arranged rotatably and slidably upon said core member and formed with a longitudinal slit adapted to admit the cable into the groove, the two members being adapted, on longitudinal relative displacement, to clamp the cable in the groove.

3. A cable grip as claimed in claim 2 wherein the core member is cylindrical and the sleeve member conical and wherein the narrow end of the sleeve member has an internal diameter which is substantially equal to the external diameter of the core member.

4. A cable grip as claimed in claim 2 wherein the core member is cylindrical and the sleeve member conical, the wide end of the sleeve member being truncated obliquely at the side formed with the slit.

5. A cable grip as claimed in claim 2 wherein the sleeve member is formed with end flanges serving as hand supports.

6. A cable grip as claimed in claim 2 wherein the core member is formed with end enlargements adapted to retain the sleeve member, one of said enlargements being extended into wings whereby the member can be rotated within the sleeve.

JOSEF RING.